United States Patent Office 3,483,869
Patented Dec. 16, 1969

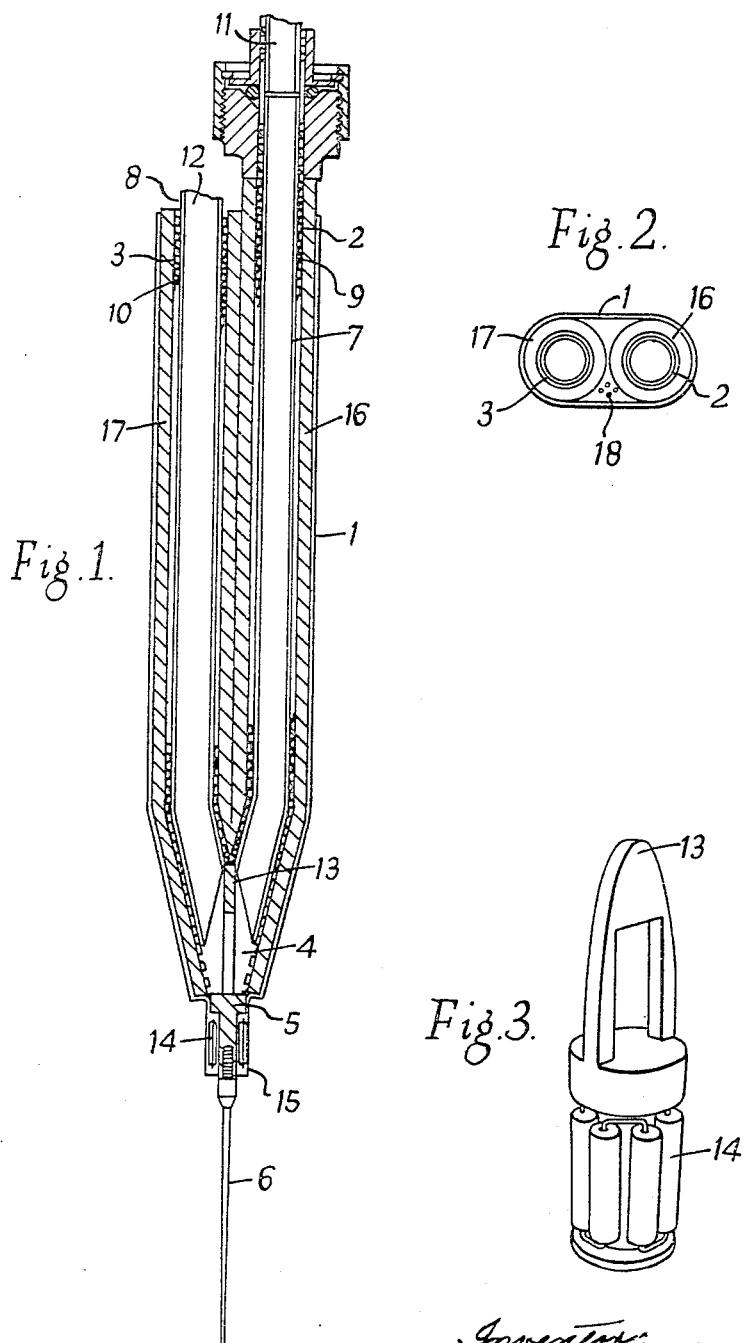

3,483,869
SURGICAL PROBES
Michael John Hayhurst, Newcastle-upon-Tyne, England,
assignor to International Research & Development Company Limited, Fossway, Newcastle-upon-Tyne, England
Filed Feb. 13, 1967, Ser. No. 615,721
Claims priority, application Great Britain, Feb. 17, 1966, 7,082/66
Int. Cl. A61b *17/36;* A61f *7/00*
U.S. Cl. 128—303.1                4 Claims

ABSTRACT OF THE DISCLOSURE

A cryogenic probe for use in ophthalmic surgery having two parallel tubes for feeding cryogenic fluid to and from a probe head carrying the probe tip to be cooled, each of the tubes being surrounded by an outer tube from which it is spaced by a flexible tubular metallic spacer constructed to provide air spaces for thermal insulation, the whole being enclosed in a non-metallic sleeve fitted with further insulating material.

---

This invention relates to surgical probes.

It is possible to use cryogenic probes for surgery particularly ophthalmic surgery. In ophthalmic surgery ocular tissue contacted by the probe is frozen and such probes can be used to produce adhesion between the probe tip and ocular tissue to produce modification of ocular tissue for surgical purposes or to induce necrotic changes in tissue for therapeutic purposes.

Since such probes must be used with great precision it is important that they should be of a convenient size and shape for use by the surgeon. At the same time, adequate thermal insulation must be provided to enable the probe to be handled when cryogenic fluid, such as liquid nitrogen, is flowing through it to cool the probe tip.

According to the present invention a surgical probe comprises an outer non-metallic casing enclosing two tubes extending substantially parallel to one another for the greater portion of their length and opening at one end into a space having an opening in which is received a probe head carrying a probe tip, whereby cryogenic fluid for cooling the probe tip may flow towards the head through one tube and away from the head through the other, each tube being located within a tubular passage and surrounded by a tubular spacer spacing it from the walls of the passage to form a gas space or spaces for thermal insulation.

The probe head may have a metallic thermall-conducting member extending into the said space to assist the cooling of the probe head.

The probe head may have a heating element therein to enable the probe tip to be rapidly heated ot a temperature at which it can be removed from tissue with which it is in contact.

Each tubular spacer is preferably flexible and may be in the form of a metal tube with a corrugated wall or of a strip wound helically to form a tube, the gas spaces in the former case being in the troughs of the corrugations on the inside and the outside of the spacer and in the latter case between the turns of the strip. In a third form the spacer may consist of a series of metal rings joined together axially by thin connecting elements giving flexibility to the spacer and forming gas spaces between the rings.

The invention will now be described in more detail with the aid of an example illustrated in the accompanying drawings, in which:

FIGURE 1 is a sectional view of a surgical probe in accordance with the present invention, FIGURE 2 is a section on line A—A of FIGURE 1, and FIGURE 3 is a perspective view of a probe head.

The surgical probe for ophthalmic surgery shown in the drawings comprises an outer non-metallic casing 1 of nylon or the like enclosing two tubes 7 and 8 surrounded by tubular spacers 2 and 3 respectively, which are preferably flexible. The spacers 2 and 3 extend substantially parallel to one another for the greater part of their length, as shown, and are joined together at one end to define a space 4 having an opening for receiving a probe head 5. The probe head 5 carries a removable probe tip 6.

The tubes 7 and 8 open into the space 4. The tubes 7 and 8 are surrounded by gas spaces 9 and 10, respectively, formed by the spacers 2 and 3. In the form shown the spacers 2 and 3 are flexible tubes formed from a helically-wound strip and the gas spaces are formed between the turns of the helices.

Cryogenic fluid, for example, liquid nitrogen, is fed through inlet 11 to inner tube 7, flows through the inner tube into space 4 and then flows in the reverse direction through inner tube 8 to an outlet 12 to atmosphere.

The probe head 5 fits into space 4 and comprises a metallic thermally-conducting member 13, for example of copper, which extends from the probe head into space 4.

The probe head also has a heating element 14 thereon to enable the probe to be rapidly heated to a temperature at which it can be removed from eye tissue with which it is in contact.

In the form illustrated, as can best be seen in FIGURE 3, the heater is in the form of a plurality of heating elements for example Nichrome wires in alumina tubes, the alumina tubes acting as electrical insulation. The element 14 is housed in a thin metal tube 15.

Each tubular spacer 2 and 3 is surrounded by thermal insulation of tubular form, insulation 16 surrounding spacer 2 and insulation 17 surrounding spacer 3. The sides in the casing 1 between the insulation 16 and 17 are filled with further thermal insulation 18.

I claim:
1. A surgical probe comprising an outer non-metallic casing, two tubular passages arranged in side-by-side relationship within said casing, two tubes each located in one of said passages, a tubular spacer between each of said tubes and the passages in which it is located, said spacers being constructed to form a gas space or spaces for thermal insulation between said tubes and said passages, a cavity in one end of said casing, said tubes communicating with said cavity, a probe head closing said cavity, and a probe tip carried by said probe head whereby said probe tips may be cooled by cryogenic fluid flowing into said cavity through one tube and out of the cavity through the other tube.

2. A surgical probe as claimed in claim 1 in which the probe head has a metallic thermally-conducting member extending into the said space to assist the cooling of the probe head.

3. A surgical probe as claimed in claim 1 in which the probe head includes a heating element.

4. A surgical probe as claimed in claim 1 in which the tubular spacer is of metal and is constructed to be flexible.

References Cited

UNITED STATES PATENTS 3,289,424   12/1966   Shepherd.
3,333,587    8/1967   Johnston _____ 128—303.1
3,351,063   11/1967   Malaker et al. _____ 128—303.1

L. W. TRAPP, Primary Examiner